United States Patent Office 3,748,307
Patented July 24, 1973

3,748,307
ENDO ALICYCLIC END CAPPED POLYQUINOXALINE RESINS
Eugene A. Burns, Palos Verdes Peninsula, and Robert J. Jones, Hermosa Beach, Calif., assignors to TRW Inc., Redondo Beach, Calif.
No Drawing. Filed Apr. 3, 1972, Ser. No. 240,831
Int. Cl. C08g 9/06
U.S. Cl. 260—72.5   18 Claims

ABSTRACT OF THE DISCLOSURE

Resins having high temperature stability can be made by curing chemically stable alicyclic endo end capped aromatic prepolymers. The prepolymers can be made by reacting proper stoichiometric amounts of a glyoxal with an aromatic tetraamine, and an end capping compound having the formula:

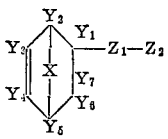

wherein $Y_1$–$Y_6$, inclusive, can be hydrogen, halogen, nitro, aryl, alkyl, alkyl ether, or alkaryl; X can be carbonyl, oxygen, sulfur, methylene, halogen substituted methylene, alkyl substituted methylene, or aryl substituted methylene; $Z_1$ can be an arylene radical, an alkylene radical having 0 to 4 carbon atoms or an amine substituted methylene radical; $Z_2$ can be a glyoxal radical, a diamine radical, or an amine radical; and $Y_7$ can be hydrogen, halogen, nitro, aryl, alkyl, alkyl ether, alkaryl or amino in a stable combination with $Y_6$. However, no more than two amino groups, in the aggregate may be present at once on $Z_2$, $Z_1$ and $Z_2$, or $Z_2$ and $Y_7$ substituent positions. The end capping compound can be synthesized by reacting a cyclodiolefin with an olefinic compound according to a Diels-Alder reaction.

BACKGROUND OF THE INVENTION

The present invention relates to stable, high temperature aromatic resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and crosslinking of the prepolymer segment.

Polyimide resins have been produced by the pyrolytic polymerization reaction of a polyimide prepolymer having end caps of bicyclo (2.2.1) hept-5-ene-2,3-anhydride as disclosed in U.S. Patent 3,528,590. The polyimide prepolymer was produced by reacting a diamine with a dianhydride and end capping the chain with a monoanhydride having the structure:

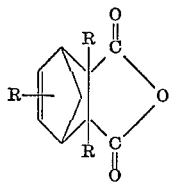

where R is hydrogen or an alkyl group.

Synthesis of compounds similar to the alicyclic endo compounds used herein have been disclosed by Diels and Alder in U.S. Patent 1,944,731. These compounds are produced by reacting a diene with a dienophile to produce a six-membered ring compound.

SUMMARY OF THE INVENTION

The high temperature aromatic resins of this invention are produced by reacting an aromatic tetraamine with an aliphatic or aromatic glyoxal and end capping the polymer chain with a substitute alicyclic endo compound. The polymer chain which is produced by reacting stoichiometric amounts of the glyoxal and the tetraamine is end capped with a substitute alicyclic endo compound having the formula:

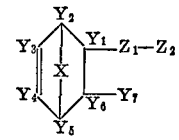

wherein $Y_1$–$Y_6$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene; halogen substituted methylene, alkyl substituted methylene, alkyl substituted methylene, or aryl substituted methylene; $Z_1$ is an arylene radical, an alkylene radical having 0 to 4 carbon atoms or an amine substituted methylene radical; $Z_2$ may be selected from any of:

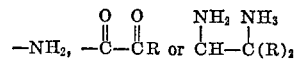

where R is hydrogen or a monovalent aliphatic or aromatic radical; and $Y_7$ can be selected from any of hydrogen, halogen, nitro, aryl, alkyl, alkyl ether, alkaryl, or amino in stable combination with $Y_6$. However, no more than two amino groups, in the aggregate, may be present at once on $Z_2$, $Z_1$ and $Z_2$, or $Z_2$ and $Y_7$ substituent positions.

The end capping endo compound is produced by a Diels-Alder reaction wherein a cyclodiolefin having a formula:

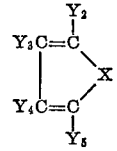

wherein $Y_2$–$Y_5$, inclusive may be selected from any of hydrogen, halogen, nitro, aryl, alkyl having 1 to 6 carbon atoms, alkyl ether having 1 to 6 carbon atoms, or alkaryl; and X may be selected from any of carbonyl, oxygen, sulfur, methylene, halogen substituted methylene alkyl substituted methylene or aryl substituted methylene is reacted with an olefinic compound having the formula:

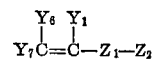

wherein $Y_1$ and $Y_6$ may be selected from any hydrogen, halogen, nitro, aryl, alkyl having 1 to 6 carbon atoms, alkyl ether having 1 to 6 carbon atoms, alkaryl; $Y_7$ may be selected from any of halogen, nitro, aryl, alkyl, alkyl ether, alkaryl, or amino in a stable combination with $Y_6$; $Z_1$ is an arylene radical, an alkylene radical having 0 to 4 carbon atoms or an amine substituted methylene radical; and $Z_2$ may be selected from any of

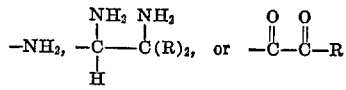

where R is hydrogen or a monovalent aliphatic or aromatic radical. However, no more than two amino groups, in the aggregate, may be present at once on $Z_2$, $Z_1$ and $Z_2$, $Z_2$ and $Y_7$ substituent positions.

The prepolymers of this invention made by reacting a glyoxal with a tetraamine and end capping the prepolymer with an alicyclic endo compound may be illustrated ideally as follows:

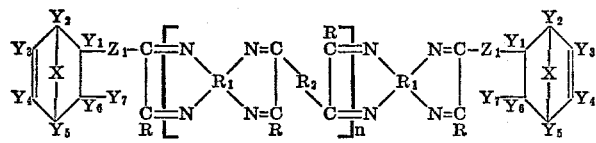

wherein $R_1$ is a tetravalent aromatic radical, $R_2$ is a divalent aromatic radical, R is hydrogen or a monovalent aliphatic radical having 1 to 4 carbon atoms, or aromatic radical, and the $n$ is an integer from 1 to 20.

If the proportions of the ingredients are reversed and an alicyclic endo diamine compound is used for the end cap, the prepolymer may be illustrated ideally as follows:

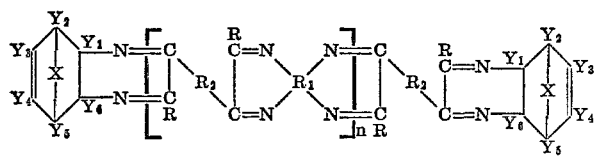

wherein R, $R_1$, $R_2$, and $n$ may be the same as in the prepolymer illustrated above.

Product properties of the cured polymer can be enhanced by the inclusion of olefinic crosslinking agents in amounts up to about 10% by weight of the resin at initiation of cure.

DISCLOSURE OF THE INVENTION

High temperature resins of this invention are made by curing prepolymers prepared by reacting stoichiometric amounts of an aromatic glyoxal with an aliphatic or aromatic tetraamine and end capping the prepolymer with an alicyclic endo compound. The prepolymers are characterized in that they are shelf-stable solids which react through the alicyclic endo compound to form a polymer having good properties in the temperature range of 300° C.–400° C. One of the chief advantages of these resins, in addition to their excellent physical and thermal properties, is the relative ease with which laminated or molded articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Alicyclic endo end cap compounds are synthesized by reacting a cyclodiolefin having the formula:

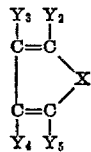

wherein $Y_2$–$Y_5$, inclusive, may be selected from any of hydrogen, halogen, nitro, alkyl having 1 to 6 carbon atoms, alkyl ether having 1 to 6 carbon atoms, or alkaryl; and X may be selected from any of carbonyl, oxygen, sulfur, methylene, substituted methylene, alkyl substituted methylene, or aryl substituted methylene, with an olefinic compound having the formula:

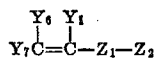

wherein $Y_6$ and $Y_1$ are selected from the same groups represented by $Y_2$–$Y_5$; $Y_7$ is selected from the same groups represented by $Y_2$–$Y_5$, and additionally, may represent an amino radical; $Z_1$ is an arylene radical, an alkylene radical having 0 to 4 carbon atoms or an amine substituted methylene radical; and $Z_2$ may be selected from any of:

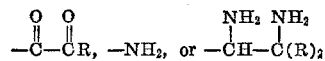

where R is hydrogen, a monovalent aliphatic or a monovalent aromatic radical. However, no more than two amino groups, in the aggregate, may be present at once on $Z_2$, $Z_1$ and $Z_2$, or $Z_2$ and $Y_7$ substituent positions. Ideally, the reaction may be represented as follows:

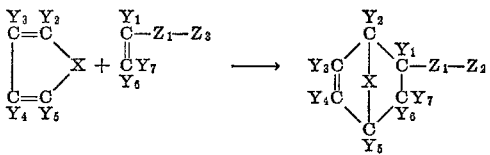

wherein $Y_1$–$Y_7$, X, $Z_1$, and $Z_2$ have been identified above. The reaction is carried out in a liquid solvent, such as benzene, and temperatures of the reaction may range from room temperature to about 200° F.

Special note should be made of the alicyclic endo diamine compound because it can be synthesized, for instance by Curtius reaction, rather than by Diels-Alder reaction. According to the Curtius reaction an alicyclic endo diacid or derivative is reacted with ammonia or hydrazine according to the following reaction:

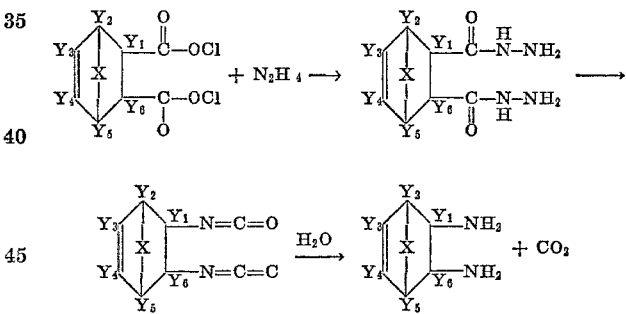

The following table provides a list of a few of the representative cyclodiolefin compounds which are suitable for reaction to produce the alicyclic endo end cap compounds.

TABLE I
furane
cyclopentadieneone
3,4-diphenylthiophene
cyclopentadiene
methylcyclopentadiene
1,1,2,3,4,5-hexachlorocyclopentadiene The following table provides a list of a few of the representative olefinic compounds which are suitable for reaction to produce the alicyclic endo end cap compound.

TABLE II
ethylene glyoxal
1-phenylethylene-2-glyoxal
1-propylene-3-glyoxal

One of the resins according to this invention may be produced by reacting proper stoichiometric amounts of an aromatic tetraamine with an alicyclic endo glyoxal at temperatures ranging from about 10° C. to about 200° C., and subsequently, or simultaneously, the mixture is reacted with an aliphatic or aromatic glyoxal in the presence of a dehydrating agent at temperatures ranging from about −18° C. to about 200° C. The reaction may be illustrated ideally as follows:

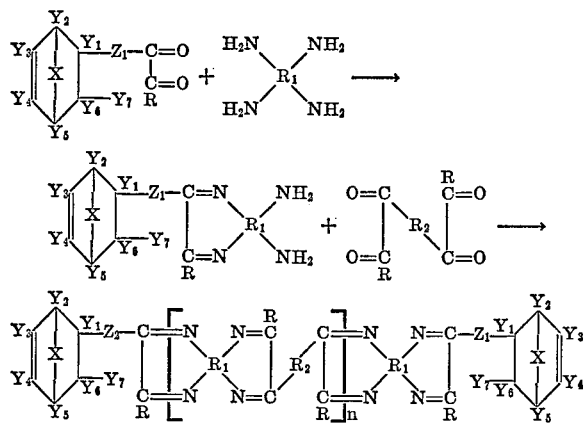

wherein $Y_1$–$Y_6$, inclusive, may be selected from hydrogen, halogen, nitro, alkyl having 1 to 6 carbon atoms, aryl, alkyl ether having 1 to 6 carbon atoms, or alkaryl; X may be carbonyl, oxygen, sulfur, methylene, halogen substituted methylene, alkyl substituted methylene, or aryl substituted methylene; $Z_1$ may be an arylene radical, or alkylene radical having 0 to 4 carbon atoms or an amine substituted methylene radical; R may be hydrogen, a monovalent aliphatic radical having 1 to 4 carbon atoms, or a monovalent aromatic radical; $Y_7$ may be hydrogen, halogen, nitro, aryl, alkyl, alkyl ether, alkaryl, or amino in stable combination with $Y_6$; $R_1$ is a tetravalent aromatic radical; $R_2$ is a divalent aliphatic or aromatic radical; and $n$ is an integer from 1 to 20.

By adjusting the proportions of the tetraamine and the glyoxal and end capping with an alicyclic endo diamine instead of a glyoxal, a prepolymer may be synthesized having the following structure:

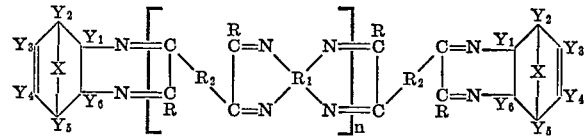

wherein the X, Y's, and R's are the same as disclosed above.

While the prepolymers may be synthesized from any aromatic tetraamine and aliphatic or aromatic glyoxals, the compounds must be capable of reacting together and must remain stable at 370° C. once they have reacted.

Examples of several typical aromatic tetraamines which may be used in this invention are:

TABLE III 3,3'-diaminobenzidine
1,2,3,5-tetraaminobenzene
3,3',4,4'-tetraaminodiphenyl ether
3,3',4,4'-tetraaminodiphenyl methane
3,3',4,4'-tetraaminodiphenyl sulfone
3,3',4,4'-tetraaminobenzophenone
2,3,6,7-tetraaminonaphthalene
2,3,5,6-tetraaminoindene
3,3',4,4'-tetraaminodiphenyl ethane
3,3',4,4'-tetraaminodiphenyl propane Examples of several typical aromatic glyoxals which may be used in the practice of this invention are:

TABLE IV 1,4-diglyoxalylbenzene
1,3-diglyoxalylbenzene
3,3-bibenzoin
4,4-bibenzoin
tetraaldoylmethane Reaction of the prepolymer to form the polymeric product occurs through the alicyclic endo end capping compounds. While the exact mechanism of the polymeric reaction is not known, it is postulated that a three-dimensional polymer is formed when the prepolymer is subjected to temperatures from approximately 230° C. to 370° C. for up to 4 hours. Although it is not necessary for cure, it has been discovered that the application of up to 700 atmospheres is beneficial in removing voids with the resultant improvement in product properties. The cure times, temperatures, and pressures are variables which depend on the composition, mass, and shape of the article being produced. For example, the cure for a large mass of neat resin may require a lower temperature applied for a longer period of time at a higher pressure in order to avoid cracking, incomplete consolidation, or voids, than a thin impregnated glass laminated article or a small article containing up to 80% by weight of inert fillers, such as inorganic salts, metals, or other common filler materials.

While it is preferred that the terminal groups on the prepolymer constitute only the alicyclic endo compounds, it has been found that up to about one half of the alicyclic endo compound can be replaced by vinyl glyoxal without materially altering the properties of the polymers. Ideally this provides a prepolymer with an unsaturated vinyl end cap at one end of the prepolymer chain and an alicyclic endo end cap at the other.

In order to enhance product properties, crosslinking agents may be incorporated into the polymer chain. Solid or liquid organic compounds having olefinic unsaturation can be added to the initial starting materials, while gaseous organic olefins are introduced into the starting material by reaction under pressure up to about 3000 p.s.i. Normally, an amount of crosslinking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, furane, crotonic acid, acrylic acid and halogenated phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinking sites may be built into the polymer chain by the use of polymer reactants having olefinic substituents; for example, a polyquinoxaline made from diglyoxalyl styrene or stilbene tetraamine. Furthermore, it should be readily apparent to those skilled in the art that various combinations of the above crosslinking agents may be used.

The following examples are illustrative of the procedures used to practice this invention.

EXAMPLE I

Approximately 6.6 grams of cyclopentadiene and 8.4 grams of ethylene glyoxal are added to 10 grams of benzene and mixed thoroughly. The solution is warmed slightly and allowed to stand for 12 hours. Crystals of 2,5-endomethylene-1-glyoxalyl - 1,2,5,6 - tetrahydrobenzene precipitate from the solution.

EXAMPLE II

Approximately 3.0 grams of 2,5-endomethylene-1-glyoxalyl - 1,2,5,6 - tetrahydrobenzene, approximately 2.2 grams of 3,3'-diaminobenzidine, and 7.8 grams of 1,4-diglyoxalylbenzene are mixed thoroughly in 300 ml. of dimethylformamide. The resulting mixture is heated to 120° C. and stirred for 3 hours. The dimethylformamide varnish is stripped of solvent by evaporation on a rotary evaporator under vacuum at 150° C. to give a dry powder. A ceramic dish containing the powder is placed in an oven at 350° C. for 30 minutes and then cooled to room temperature. A rigid, thermoset polymer is formed.

We claim:
1. A method of making a prepolymer comprising reacting proper stoichiometric amounts of
(A) an aromatic tetraamine;
(B) a glyoxal; and
(C) an end cap compound comprising a substituted alicyclic endo compound having the formula:

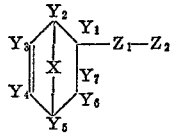

to give a prepolymer having 1 to 20 repeating units, wherein $Y_1$–$Y_6$, inclusive, is selected from the group consisting of halogen, hydrogen, nitro, aryl, alkyl having 1 to 6 carbon atoms, alkyl ether having 1 to 6 carbon atoms, alkaryl; X is selected from the group consisting of carbonyl, oxygen, sulfur, methylene, halogen substituted methylene, alkyl substituted methylene, aryl substituted methylene; $Z_1$ is selected from the group consisting of an alkylene radical having 0 to 4 carbon atoms or an amine substituted methylene radical; $Z_2$ is selected from the group consisting of

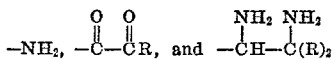

where R is a monovalent aliphatic or aromatic radical; and $Y_7$ is selected from the group consisting of hydrogen, halogen, nitro, aryl, alkyl having 1 to 6 carbon atoms, alkyl ether having 1 to 6 carbon atoms, alkaryl, and amino; wherein when amino substituent groups are present on the end cap compound, the number is two.

2. A method of making a prepolymer according to claim 1 wherein the glyoxal is an aromatic glyoxal.
3. A method of making a prepolymer according to claim 1 wherein the glyoxal is an aliphatic glyoxal.
4. A method of making a prepolymer according to claim 1 wherein the glyoxal is diglyoxalylbenzene.
5. A method of making a prepolymer according to claim 1 wherein one of the end cap compounds is replaced by a glyoxal ethylene radical.
6. A method of making a prepolymer according to claim 1 wherein one of the end cap compounds is replaced by a vinyl glyoxal radical.
7. A method of making a prepolymer according to claim 1 wherein the glyoxal is tetraaldoylmethane.
8. A thermosetting polyquinoxaline prepolymer having the formula:

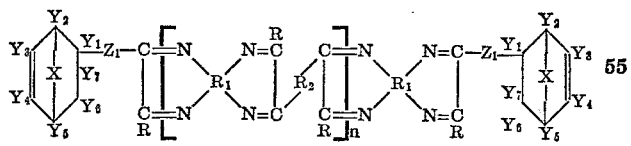

wherein R is selected from the group consisting of hydrogen, a monovalent aliphatic radical having 1 to 4 carbon atoms, and a monovalent aromatic radical; $R_1$ is a tetravalent aromatic radical; $R_2$ is a divalent aromatic radical; $Y_1$–$Y_6$, inclusive, is selected from the group consisting of hydrogen, halogen, nitro, aryl, alkyl having 1 to 6 carbon atoms, alkyl ether having 1 to 6 carbon atoms, alkaryl; X is selected from the group consisting of carbonyl, oxygen, sulfur, methylene, halogen substituted methylene, alkyl substituted methylene, aryl substituted methylene; $Z_1$ is selected from the group consisting of an arylene radical, an alkylene radical having 0 to 4 carbon atoms and an amine substituted methylene radical; $Y_7$ is selected from the group consisting of hydrogen, halogen, nitro, aryl, alkyl having 1 to 6 carbon atoms, alkyl ether having 1 to 6 carbon atoms, alkaryl, and amino; and $n$ is an integer from 1 to 20.

9. A prepolymer according to claim 8 wherein the glyoxal is an aromatic glyoxal.
10. A prepolymer according to claim 8 wherein the glyoxal is an aliphatic glyoxal.
11. A prepolymer according to claim 8 wherein the glyoxal is diglyoxalylbenzene.
12. A prepolymer according to claim 8 wherein the glyoxal is tetraaldoylmethane.
13. A prepolymer according to claim 8 wherein one half of the end cap compound is replaced with glyoxal ethylene.
14. A prepolymer according to claim 8 wherein one half of the end cap compound is replaced with a vinyl glyoxal radical.
15. A prepolymer according to claim 8 wherein an olefinic crosslinking agent is added.
16. A resin product comprising curing the prepolymer of claim 8.
17. A resin product comprising curing the prepolymer of claim 14.
18. A resin product comprising curing the prepolymer of claim 15.

References Cited

UNITED STATES PATENTS

| | | | |
|---|---|---|---|
| 2,895,944 | 7/1959 | Mark | 260—65 |
| 3,528,950 | 9/1970 | Lubowitz | 260—78 TF |
| 3,661,850 | 5/1972 | Stille | 260—72.5 X |

HOWARD E. SCHAIN, Primary Examiner

U.S. Cl. X.R.

161—198; 260—49, 52, 64